(12) United States Patent
Fiess et al.

(10) Patent No.: US 9,676,329 B2
(45) Date of Patent: Jun. 13, 2017

(54) CAMERA SYSTEM AND METHOD FOR OPERATING A CAMERA SYSTEM FOR A MOTOR VEHICLE

(75) Inventors: Reinhold Fiess, Durbach (DE); Annette Frederiksen, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1526 days.

(21) Appl. No.: 13/284,299

(22) Filed: Oct. 28, 2011

(65) Prior Publication Data

US 2012/0113258 A1 May 10, 2012

(30) Foreign Application Priority Data

Nov. 5, 2010 (DE) .......................... 10 2010 043 479

(51) Int. Cl.
  *H04N 7/18* (2006.01)
  *B60R 1/00* (2006.01)
  *B60S 1/08* (2006.01)

(52) U.S. Cl.
  CPC .......... *B60R 1/00* (2013.01); *B60R 2300/108* (2013.01); *B60S 1/0844* (2013.01)

(58) Field of Classification Search
  CPC ..... B60R 1/00; B60R 11/04; B60R 2300/108; B60S 1/0844; G01N 21/47; G01N 21/552
  USPC .................................................. 348/135, 148
  See application file for complete search history.

(56) References Cited

U.S. PATENT DOCUMENTS

| 8,007,187 | B1* | 8/2011 | Chen ........................... 396/352 |
| 2006/0243894 | A1* | 11/2006 | Takenaga et al. ........ 250/227.25 |
| 2008/0279543 | A1 | 11/2008 | Blaesing et al. |
| 2009/0085755 | A1 | 4/2009 | Schafer et al. |
| 2009/0092284 | A1* | 4/2009 | Breed et al. ................... 382/103 |
| 2010/0312446 | A1* | 12/2010 | Schofield et al. .............. 701/70 |
| 2011/0085050 | A1* | 4/2011 | Dowski et al. ............ 348/222.1 |
| 2012/0026318 | A1* | 2/2012 | Huelsen et al. .............. 348/135 |

FOREIGN PATENT DOCUMENTS

| CN | 101861542 A | 10/2010 |
| CN | 101960373 A | 1/2011 |
| DE | 10 2004 015 040 | 10/2005 |
| EP | 0772078 A1 | 5/1997 |
| EP | 2189340 A2 | 5/2010 |
| WO | 2005113293 A1 | 12/2005 |
| WO | 2010076066 A1 | 7/2010 |

* cited by examiner

*Primary Examiner* — Neil Mikeska
(74) *Attorney, Agent, or Firm* — Gerard Messina

(57) ABSTRACT

A camera system for a motor vehicle includes an image sensor for outputting image signals and multiple optical elements. The optical elements include a switchable optical element which is part of a first camera optical system in the first switching state and part of a second camera optical system in a second switching state. Optical elements form the first camera optical system for detecting a first surrounding and for imaging the first surrounding on the image sensor with the aid of a first object distance, and optical elements form the second camera optical system for detecting a second surrounding and for imaging the second surrounding on the image sensor with the aid of a second object distance which differs from the first object distance.

10 Claims, 2 Drawing Sheets

CAMERA SYSTEM AND METHOD FOR OPERATING A CAMERA SYSTEM FOR A MOTOR VEHICLE

BACKGROUND OF THE INVENTION

1. Field of the Invention

The present invention relates to a camera system and a method for operating a camera system for a motor vehicle.

2. Description of Related Art

Camera systems for motor vehicles are generally known. Camera systems are known, for example, which are used to detect the surroundings of a motor vehicle as part of a driver assistance system. The image data of the vehicle's surroundings which are recorded using the camera system may be used to support a driver in the form of a night vision support, a traffic sign detection or lane detection, or as traffic control, for example. Furthermore, it is known to use camera systems to detect a state of a vehicle window.

Published German patent application document DE 102004015040 A1 discloses a video-based rain sensor, a sharply defined image of the surroundings of the vehicle on the one hand, and of the window on the other hand being processed and analyzed by dividing the image sensor into two adjacent image regions. The camera itself is focused on infinity, in practice 15 to 30 meters; the region of the image recorded using this focusing is called primary image and is used for functions such as a driver assistance system, lane departure warning (LDW) or road sign recognition, for example. An additional optical element, a lens or a mirror, implements the image focusing of the camera within another image region, the secondary image, on the windshield. The image of the focused rain drops on the window recorded by the car camera may be analyzed using an image processing algorithm, and the drops may be detected. Due to the division of the image sensor, the primary image does not have the entire sensor surface available to it.

BRIEF SUMMARY OF THE INVENTION

In contrast, the camera system and the method for operating a camera system for a motor vehicle according to the present invention have the advantage that a primary image focused on a first object distance may use the entire sensor surface, and a secondary image focused on a second object distance, which differs from the first object distance, may use the sensor surface partially or entirely. No larger image sensor or appropriate reader electronics are necessary. Furthermore, mutual interferences in a transition zone between the separate image regions according to the related are omitted, without the need for using a diaphragm which in turn negatively affects the brightness scale in the transition area. The primary function is only slightly disturbed when a rain sensor is integrated into the driver assistance camera.

Another advantage is that, depending on the driving situation, an appropriate observing time may be made available to the primary image and the secondary image. Such a dynamic switching allows for adapting to the surrounding situation to the best possible extent. Another advantage is that all bordering regions of the image sensor are available to the primary functions which analyze the primary image. It is the primary functions that need the bordering regions of the image most. For example, the lower region must be analyzed for the LDW, in order to detect the course of the roadway. For detecting road signs and traffic lights, the upper image region is needed.

DETAILED DESCRIPTION OF THE INVENTION

Figure 1:
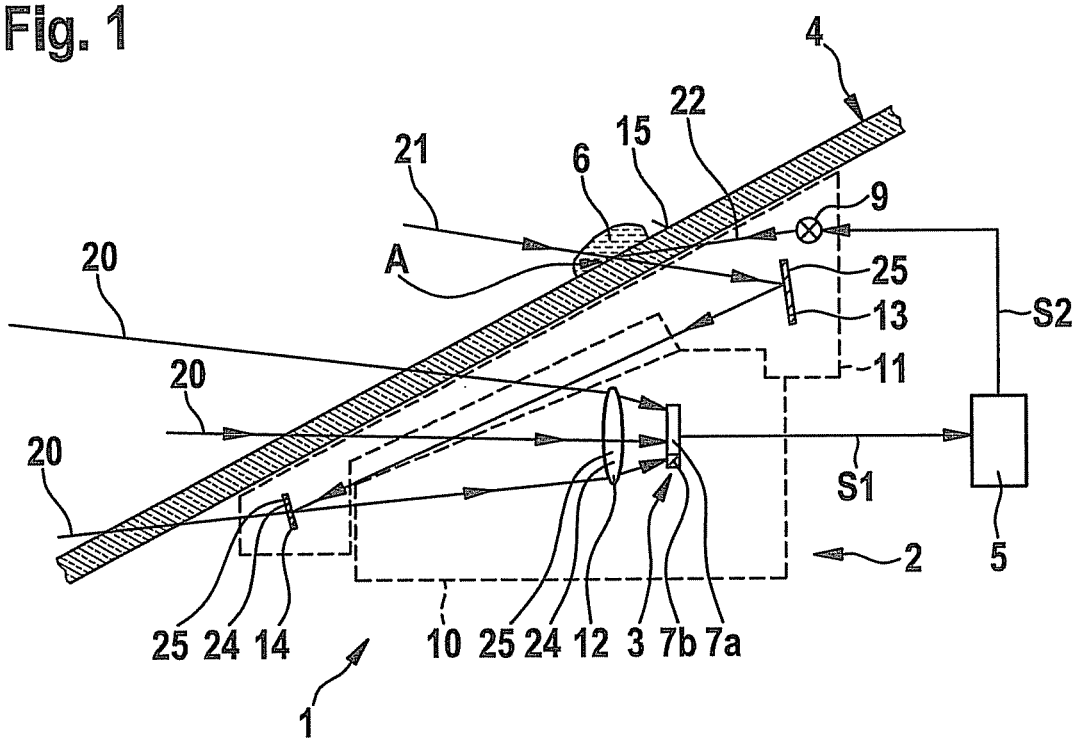
FIG. 1 shows a specific embodiment of a camera system.
Figure 2:
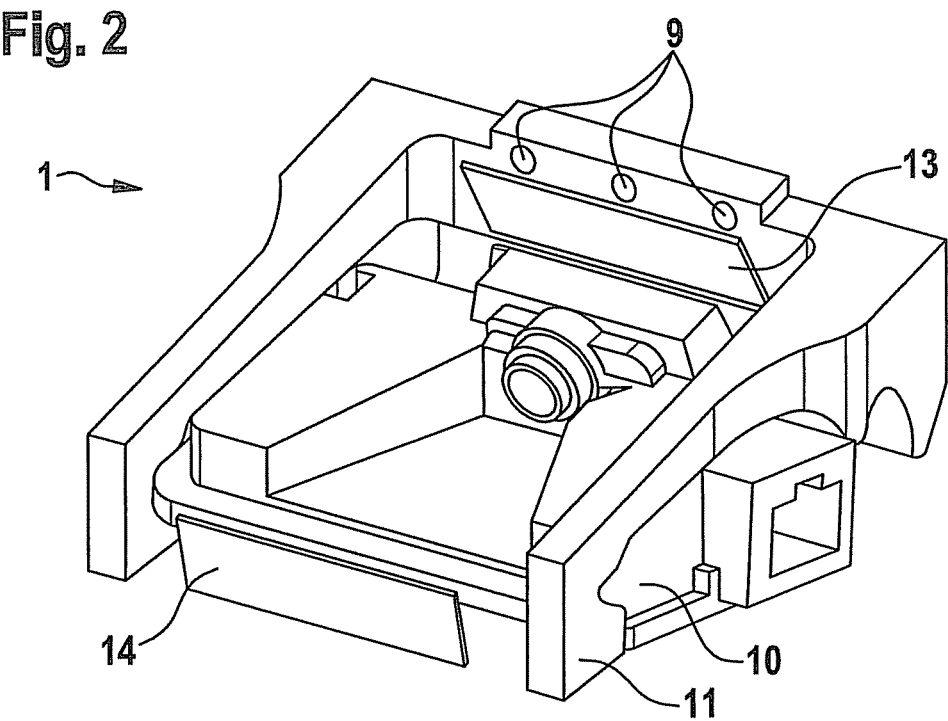
FIG. 2 shows a perspective view of the camera system.
Figure 3:
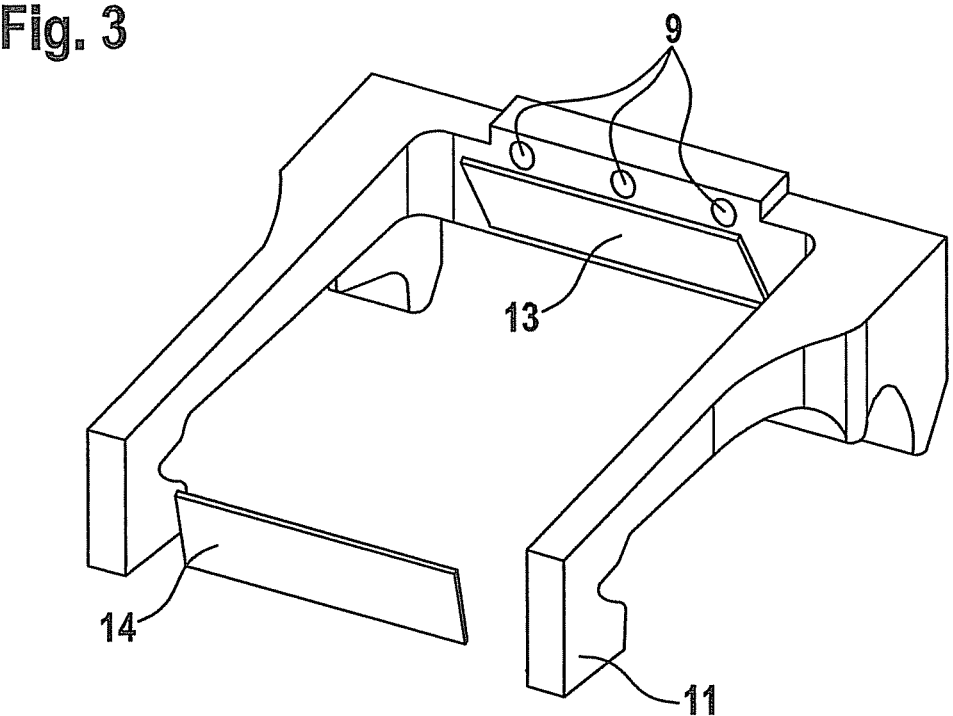
FIG. 3 shows a perspective view of a camera mounting of the camera system.

Identical or corresponding components are provided with the same reference numerals in the figures.

A camera system 1 is implemented for a motor vehicle for detecting its surroundings. Camera system 1 includes a camera 2 and a camera mounting 11. Camera mounting 11 is attached to a vehicle window 4, in this case a windshield, in a motor vehicle passenger compartment of a motor vehicle (not shown in greater detail), and supports and positions camera 2. Camera 2 has a camera housing 10, an image sensor 3 as well as optical elements. The optical elements include an objective 12 illustrated here in the form of a lens, a reflecting mirror 13, and a switchable optical element 14. Switchable optical element 14 is transmitting in a first switching state and reflecting in a second switching state. Image sensor 3 is designed as a semiconductor in the form of a CMOS or CCD component, for example, which outputs image signals S1. A first camera optical system 24, which is composed of multiple optical elements, specifically objective 12 and switchable optical element 14, images in a sharply defined manner a first surrounding, here the surroundings of the vehicle located in front of the motor vehicle in the direction of travel, for example, through vehicle window 4 onto entire image sensor 3.

For this purpose, switchable optical element 14 is in the first switching state, the transmission. Here, first radiation 20, which is incident through vehicle window 4, is imaged or focused onto entire sensor surface 7a and 7b of image sensor 3.

A second camera optical system 25 which is composed of multiple optical elements, specifically objective 12, switchable optical element 14, and reflecting mirror 13, images in a sharply defined manner a second surrounding, here a section A of a window surface 15 of window 4 onto sensor surface 7b of image sensor 3. For this purpose, switchable optical element 14 is in the second switching state, the reflection. Thus, second radiation 21 emanating from section A of vehicle window 4 or second radiation 21 passing through section A passes, consecutively through reflecting mirror 13, switchable optical element 14 and objective 12, and is imaged or focused on sensor surface 7b of image sensor 3. Second radiation 21 may originate from the surroundings of the vehicle, as shown in the drawing, and pass through vehicle window 4, possibly also through a water drop 6 adhering to it, or it may originate from the passenger compartment of the vehicle and be reflected accordingly. For the sake of simplicity and clarity, FIG. 1 does not show the optical path through vehicle window 4 and water drop 6 in detail, but in a simplified manner.

In this exemplary embodiment, the object distance of first camera optical system 24 is infinite; the object distance of second camera optical system 25 is finite and it focuses on the range of vehicle window 4. A suitable distance between mirror 13 and switchable optical element 14 in the second switching state allows the formation of a sufficiently large object distance, in order to still image a section A, which is located relatively closely to camera 2, on image sensor 3, having good image-forming properties. Alternatively, it is also possible to use optical elements 12, 13, 14 together with other object distances or additional optical elements, e.g., lenses and/or gratings.

Furthermore, camera system 1 includes an analyzing device 5 which is designed in such a way that it analyzes image signals S1 which contain the image information of first sensor surface 7a and second sensor surface 7b of image sensor 3. The image information of second surrounding A is analyzed here for ascertaining a pane condition of vehicle window 4. In this case, analyzing device 5 is in particular designed in such a way that a differing wetting of section A of vehicle window 4 by water drops 6 is ascertained, and this information, as part of a rain sensor function, for example, may be further used, for activating a windshield wiper, for example. Alternatively or additionally, it is also possible to ascertain a dirty or damaged, for example by a scratch, window 4. Furthermore, camera system 1 advantageously includes a light source 9, for example one or multiple LEDs, with the aid of which section A of vehicle window 4 is additionally illuminatable with the aid of radiation 22. For this purpose, light source 9 is situated in such a way that radiation 22 reflected in the area of section A may strike image sensor 3 via second camera optical system 25. Light source 9 allows, in particular under bad lighting conditions, e.g., at night, section A to be illuminated in order to generate a sufficiently bright image of section A on image sensor 3, the latter being advantageous for analyzing the window condition. Light source 9 may be activated with the aid of control signals S2 from analyzing device 5, which thus also represents a control unit, or may otherwise be activated by another device.

Image sensor 3 and objective 12 are thus situated in camera housing 10 of camera 2. Reflecting mirror 13, switchable optical element 14 and light source 9 are situated in or on camera mounting 11 which thus forms its own module for the function of detecting the window condition. Alternatively, it is, however, also possible to provide at least parts of second camera optical system 25 and/or light source 9 on camera housing 10.

Analyzing device 5 is advantageously situated within camera housing 10; it may, however, also be situated outside, as part of a central control unit of a vehicle assistance system, for example.

Alternatively, instead of a section A of vehicle window 4, the second surrounding may, for example, be a surrounding of the vehicle which detects a roadside, traffic signs on the roadside, or traffic information signs above the vehicle, or even the passenger compartment of the vehicle, in each individual case another object distance than in the first surrounding being adjustable according to the present invention. The direction of view may be deflected via optical elements, in particular via mirrors.

In camera system 1, optical elements 12, 13, 14 have a switchable optical element 14 which is part of first camera optical system 24 in a first switching state and part of second camera optical system 25 in a second switching state. Entire switchable optical element 14 is switchable and is partially situated in the optical path of first camera optical system 24, and the second surrounding is imaged on subrange 7b of image sensor 3. Alternatively, it is possible to design only a part of switchable optical element 14 to be switchable. In this configuration, entire switchable optical element 14 would partially be situated in the optical path of first camera optical system 24, and the second surrounding would be imaged on one subrange of the image sensor. Alternatively, entire switchable element 14 could be switchable and be entirely situated in the optical path of first camera optical system 24, and the entire second surrounding would be imaged on image sensor 3, i.e., on both subranges 7a and 7b of image sensor 3. In all variants, the entire image sensor is available to the first surrounding.

Switchable optical element 14 is essentially transparent in the first switching state and essentially reflecting in the second switching state. Alternatively, additional switching states are possible which represent mixed states of the first and the second switching state. In this case, the transmission may be changed as a function of the applied voltage, for example in the range between approximately 0% and 100%. Depending on the existing rain situation, the transmission of the main mirror may thus be dynamically changed. In the case of dry weather, the highest transmission may be selected, for example. In such a mixed state, the first surrounding and the second surrounding are superimposed on the image sensor with a controllable proportional ratio. An analyzing software may take this into account. The additional expenditure for the more complex analysis is offset by the fact that the primary functions may use the camera image for particularly long time intervals. Additionally, it is possible to switch over at regular intervals and to thus ensure a more accurate checking of the rain situation.

The switchable optical element is made of an electrochromic material. Switchable mirrors may, for example, be implemented using an LCD material.

Figure 4:
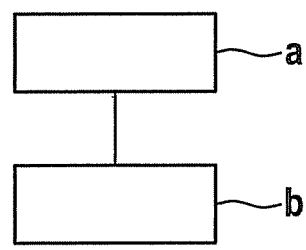
FIG. 4 shows a flow chart of a specific embodiment of the method according to the present invention.

In FIG. 4, a flow chart explains the method for operating a camera system for a motor vehicle which includes a camera 2 having an image sensor 3 for outputting image signals S1 as well as optical elements, the optical elements having a switchable optical element. In this case, the method steps recur:

a) switching the switchable optical element into the first switching state; and b) switching the switchable optical element into the second switching state.

In method step a), switchable optical element 14 is in a first switching state and is part of a first camera optical system 24 for detecting a first surrounding and for imaging the first surrounding on image sensor 3 with the aid of a first object distance.

In method step b), switchable optical element 14 is in a second switching state and is part of a second camera optical system 25 for detecting a second surrounding and for imaging the second surrounding on image sensor 3 with the aid of a second object distance which differs from the first object distance.

The first switching state is advantageously significantly longer than the second switching state. A switchover between the first switching state and the second switching state is controlled according to a driving situation and/or weather situation.

What is claimed is:

1. A camera system for a motor vehicle, comprising:
   an image sensor for outputting image signals;
   a first camera optical system for detecting a first surrounding and for imaging the first surrounding on the image sensor at a first object distance; and
   a second camera optical system for detecting a second surrounding and for imaging the second surrounding on the image sensor at a second object distance which differs from the first object distance;

wherein a switchable optical element which is configured to be (i) part of the first camera optical system in a first switching state of the switchable optical element, and (ii) part of the second camera optical system in a second switching state of the switchable optical element.

2. The camera system as recited in claim 1, wherein the switchable optical element is at least partially situated in an optical path of the first camera optical system.

3. The camera system as recited in claim 1, wherein the switchable optical element is transparent in the first switching state and reflecting in the second switching state.

4. The camera system as recited in claim 1, wherein the switchable optical element is made of an electrochromic material.

5. The camera system as recited in claim 1, wherein the switchable optical element is made of an LCD material.

6. The camera system as recited in claim 1, wherein the switchable optical element has an optically switchable range and an optically non-switchable range.

7. The camera system as recited in claim 1, wherein the camera system is set up as a rain sensor in the second switching state.

8. A method for operating a camera system for a motor vehicle, the camera system including an image sensor for outputting image signals, a first camera optical system for detecting a first surrounding and for imaging the first surrounding on image sensor at a first object distance, and a second camera optical system for detecting a second surrounding and for imaging the second surrounding on the image sensor at a second object distance which differs from the first object distance, the method comprising:

providing a switchable optical element;
switching the switchable optical element into a first switching state, wherein the switchable optical element is part of the first camera optical system in the first switching state; and
switching the switchable optical element into a second switching state, wherein the switchable optical element is part of the second camera optical system in the second switching state.

9. The method as recited in claim 8, wherein the first switching state is longer than the second switching state.

10. The method as recited in claim 8, wherein a switchover between the first switching state and the second switching state is controlled according to at least one of a driving situation and weather situation.

* * * * *